United States Patent [19]

Yamamoto et al.

[11] 4,288,823

[45] Sep. 8, 1981

[54] APPARATUS FOR AND METHOD OF DISTINGUISHING PAUSES TO CONTROL SELECTIVE REPLAY IN TAPE RECORDING/REPRODUCTION SYSTEMS

[75] Inventors: Ryuji Yamamoto, Kitasoma; Fukumori Nakahara, Tokyo; Tadao Kasai, Koshigaya, all of Japan

[73] Assignee: Soundesign Corporation, Jersey City, N.J.

[21] Appl. No.: 133,731

[22] Filed: Mar. 25, 1980

[30] Foreign Application Priority Data

Mar. 28, 1979 [JP] Japan ................................ 54-35644

[51] Int. Cl.$^3$ ...................... G11B 15/16; G11B 15/18; G11B 27/22

[52] U.S. Cl. ...................................... 360/73; 360/72.2; 360/74.4

[58] Field of Search ................. 360/73, 72.2, 71, 72.1, 360/74.4, 74.1

[56] References Cited

U.S. PATENT DOCUMENTS

Re. 30,416 10/1980 Yasunaga ........................... 360/72.1
3,723,666 3/1973 Ferrari ................................ 360/72.1
3,984,869 10/1976 Fujii et al. ............................ 360/73
4,237,497 12/1980 Trevithick ......................... 360/74.1

*Primary Examiner*—Alfred H. Eddleman
*Attorney, Agent, or Firm*—Kirschstein, Kirschstein, Ottinger & Cobrin

[57] ABSTRACT

Recorded features on a recording medium have inter-feature pauses between features and intra-feature pauses during features. In order to selectively replay the recorded features, the inter-feature pauses must be detected and reliably distinguished from the intra-feature pauses. An information signal indicative of the time duration of each pause is generated, and a tape speed signal indicative of the speed of the recording medium is generated throughout advancement of the latter. A decision time period is initially established as the standard for distinguishing between inter-feature and intra-feature pauses. The decision period is updated in response to changes in the advancement speed of the recording medium. The time duration of each pause is compared with the time duration of the updated decision period for generating an output control signal which controls the selective replay capability of the recording/reproduction system. The updating may be continuously performed in an analog manner, or in a digital manner wherein the updating occurs at least once per every revolution of the supply and takeup reels of the recording/reproduction system.

24 Claims, 8 Drawing Figures

AMPLIFIER
18
BANDPASS FILTER
20
SATURATION AMPLIFIER
22
DETECTOR
24
NOISE SUPPRESSOR
26
SCHMITT TRIGGER
28
CONTROL CIRCUITRY
30
CLOCK 60 Hz
32
OUTPUT CONTROL SIGNAL
TAPE SPEED SIGNAL
MODE SELECT SIGNAL
INFORMATION SIGNAL
FF
46
REW
48
42
44
40
50
10
12
14
16
A
B
C
D
E

A AMPLIFIED AUDIO SIGNAL
B SATURATED AUDIO SIGNAL
C INFORMATION SIGNAL
D CLOCK SIGNAL
E TAPE SPEED SIGNAL
a a' b b' c c' d d'
SIGNALS

FIG. 4
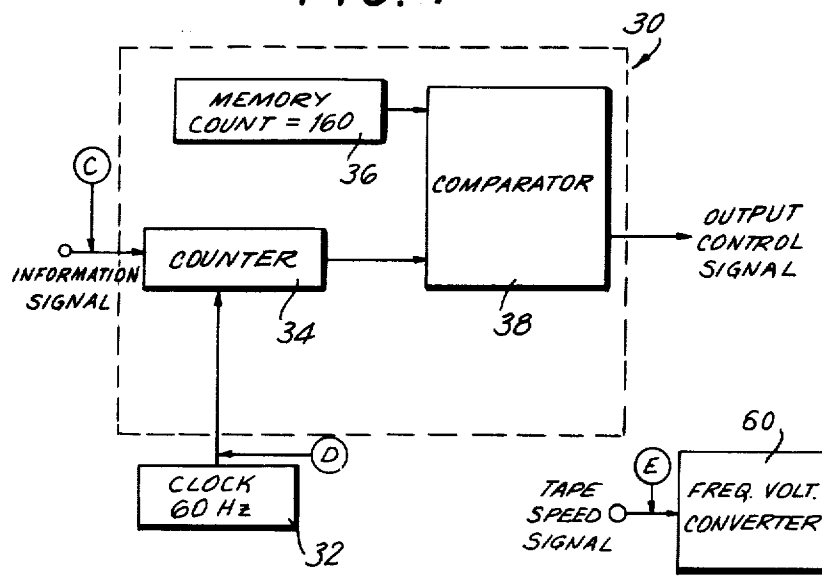
FIG. 6
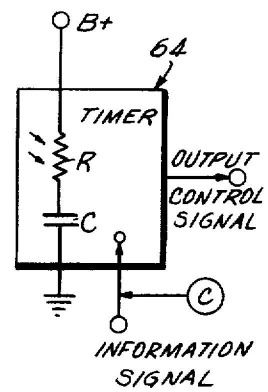
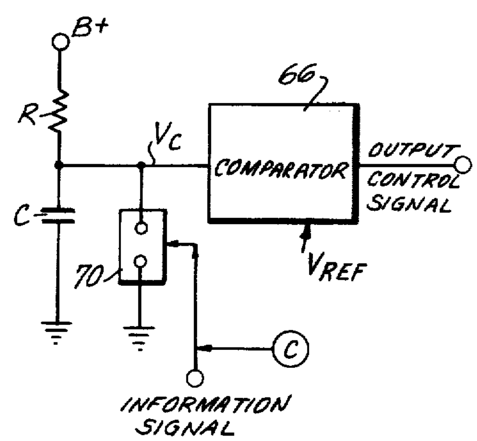
FIG. 7
FIG. 8
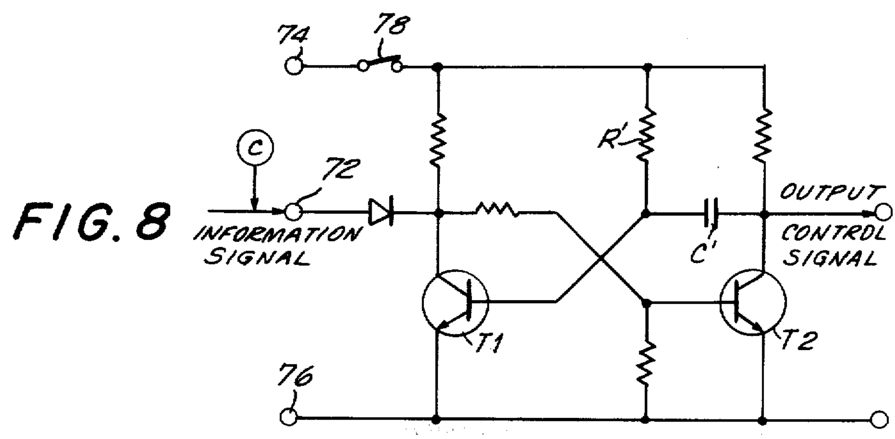

APPARATUS FOR AND METHOD OF DISTINGUISHING PAUSES TO CONTROL SELECTIVE REPLAY IN TAPE RECORDING/REPRODUCTION SYSTEMS

BACKGROUND OF THE INVENTION

1. Field of the Invention

This invention generally relates to tape recording/reproduction systems of the type having the capability of automatically finding a feature recorded on the magnetic tape by detecting the pauses between the recorded features, and thereupon of precisely positioning the selected feature relative to the tape head for replay. More particularly, this invention relates to an improved apparatus for, and method of, reliably distinguishing between interfeature pauses between features and intra-feature pauses during features in order to accurately control the selective replay of the recorded features.

2. Description of the Prior Art

It is customary to record many features or programs on a recording medium such as a magnetic recording tape. Automatic feature finder systems have been proposed to replay on tape recording/reproduction systems features which have been pre-selected by the listener, while bypassing other features.

Typically, the feature finder systems detect the inter-feature pauses, i.e. the blank areas between successive features on the tape on which no signals were recorded, while the tape is advancing at fast forward or rewind speed. The detected interfeature pause is then used to precisely position the selected feature at its beginning at the playback head, and to concomitantly change the tape speed to the playback mode.

However, the feature finder system malfunctions when it mistakes an inter-feature pause for an intra-feature pause, i.e. a silence or very low volume passage occuring during a feature. In order to distinguish between inter-feature and intra-feature pauses, it has been suggested to make the inter-feature pause longer than any intra-feature pause. However, the duration of any pause is a factor of whether the tape is advancing at the playback, or fast forward, or rewind speed, as well as being a factor of where the pause occurs on the tape itself.

To explain in more detail, the playback speed of tape in a capstan-driven tape recorder is constant over the length of the tape However, in the fast forward or rewind mode, the tape is not driven by the capstan, but instead the drive motor is respectively coupled to the takeup reel or supply reel. The tape speed is much faster in the fast forward and rewind modes as compared to the playback mode, thus complicating the detection of the duration of a pause.

For example, assume that a given tape has an inter-feature pause of three seconds duration at playback speed, and also has an intra-feature pause of 0.3 seconds duration. Let us further assume that the fast forward speed is ten times the playback speed. It follows then that the three second inter-feature pause detected during fast forward speed will be picked up in the same period of time as the 0.3 second intra-feature pause detected during playback.

The detection problem is even further compounded by the fact that the tape speed is not constant during either the fast forward or the rewind mode. In fast forward, for example, the takeup reel is driven at a substantially constant rate. The tape speed, however, increases as the advancement of the tape progresses since the diameter of the coil of the tape on the takeup reel increases.

Similarly, in the rewind mode, the supply reel is driven at a substantially constant speed, and as the tape is rewound, the radius of the tape, i.e. the distance of the outermost circumferential portion of the tape from the center of the supply reel, is increased, and concomitantly, the tape speed increases.

Typically, the tape speed at the beginning of a tape, which is advancing at the fast forward or rewind speeds, will be about ten times of the tape speed in the playback mode. The tape speed at the end of the tape depends, of course, on the length of the tape and the size of the reels. For exemplary purposes, the tape speed at the end of a tape can be assumed to be about twenty-five times that of the tape speed in the playback mode.

To repeat the above analysis, an inter-feature pause of three seconds duration will require $3/10=300$ milliseconds to pass by the playback head if it is located at the beginning of the tape which is in the fast forward mode. At the end of the tape, the inter-feature pause requires $3/25=120$ milliseconds. Hence, the automatic feature finding system must also take into account whether a pause is at the beginning or at the end of a tape.

A standard time period must be established to distinguish between inter-feature and intra-feature pauses. However, if the time period is of fixed time duration, then the automatic feature finding system cannot reliably distinguish between the two types of pauses due to the different tape speeds in different modes of operation, and due to the ever-changing and variable tape speed in the fast forward and rewind modes of operation.

The prior art has proposed various electrical and mechanical feedback circuits for measuring the speed of the reels, detecting the change in the tape speed, and thereupon maintaining the tape speed at a constant value. The prior art has also proposed modifying the tape speed by increasing it at some portions, and slowing it down at some desired portion. However, all of these methods lower the tape running speed. It takes longer to locate the desired feature, and of course, the circuitry for accomplishing the change in the tape speed is very complex.

Another prior art proposal is to update the standard time period each time an inter-feature pause is detected. U.S. Pat. No. 3,723,666 discloses one such system which mechanically switches in different time periods in a pre-set order every time the system detects a pause between features.

However, the known systems have not proven to be altogether satisfactory, because they do not take the tape speed into consideration. For example, by changing the decision period in a pre-set order, the same decision period will serve as the standard no matter whether the tape is started from its beginning, or from the middle of the tape. Furthermore, a certain amount of time is required for a tape to come up to its running speed. If an intra-feature pause is reached before the tape reaches its running speed, then the system will mistake it for an inter-feature pause, and cause the entire system to malfunction.

Another problem associated with the known systems is that the number of inter-feature pauses may not correspond with the number of pre-established time periods. Also, tapes come in different lengths. Hence, the pre-established time periods for a tape having a fifteen minute length is wholly inadequate for another tape having a two hour length. Still another problem is that the system should be able to convert from fast forward mode to rewind mode. However, the known systems having pre-set time periods cannot be easily converted.

SUMMARY OF THE INVENTION

1. Objects of the Invention

Accordingly, it is the general object of the present invention to overcome the aforementioned drawbacks of the prior art.

Another object of the invention is to reliably distinguish between inter-feature and intra-feature pauses in all modes of operation and at all speeds of advancement of the recording tape.

Still another object of the present invention is to distinguish between inter-feature and intra-feature pauses no matter whether they are located at the beginning of a tape or at the end of the tape.

Another object of the invention is to update the decision period for judging inter-feature and intra-feature pauses in response to changes in the advancement speed of the tape.

A further object of the invention is to continuously update the aforementioned decision period in an analog manner.

Still another object of the invention is to update the aforementioned decision period at least once for each revolution of the takeup and/or supply reel of the tape recorder/reproduction system.

Another object of the invention is to provide a novel apparatus for, and method of, reliably distinguishing between inter-feature and intra-feature pauses.

2. Features of the Invention

In keeping with these objects and others which will become apparent hereinafter, one feature of the invention resides, briefly stated, in an apparatus for, and method of, reliably distinguishing between inter-feature pauses between features and intra-feature pauses during features in recording/reproduction systems of the type in which the recording medium, i.e. tape, may be advanced at any one of a selected playback speed, fast forward speed, and rewind speed. Specifically, the system is of the type which selectively replays features recorded on the tape in response to detection of the inter-feature pauses.

The invention includes a playback head for detecting the features and the pauses on the tape, and recording medium sensor circuitry for generating from the tape an information signal indicative of the time duration of each detected pause.

The invention also includes speed sensor circuitry for detecting the advancement speed of the tape, and for generating therefrom a tape speed signal indicative of the speed of the tape throughout its advancement.

The invention further includes time-updating circuitry for establishing an initial decision period of predetermined time duration. This decision period serves as the standard against which an inter-feature pause will be distinguished from an intra-feature pause. The time-updating circuitry is responsive to the tape speed signal, and is operative for changing the time duration of the initial decision period in response to changes in the advancement speed of the tape.

Control output circuitry is operative for comparing the time duration of each detected pause with the time duration of the updated decision period, and for generating an output control signal to control the selective replay of the recorded features.

Hence, this invention is operative to distinguish between inter-feature and intra-feature pauses at all advancement speeds, no matter whether the tape is in the playback mode or fast forward mode or rewind mode, and no matter whether the tape speed varies during its advancement in the fast forward or rewind modes.

Another feature of the invention resides in the feature of continuously updating the decision period in an analog manner, or in the alternative, in updating the decision period very often in a digital manner. For example, the decision period can be updated at least once, and preferably more than once, for each revolution of the takeup or supply reels.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is an electrical circuit block diagram showing in detail a preferred embodiment of the time-update circuitry and control output circuitry for use in the apparatus and method of FIG. 1 in the playback mode;

FIG. 6 is an electrical circuit block diagram of another embodiment of the time-update circuitry and control output circuitry for use in the apparatus and method of FIG. 1;

FIG. 7 is an electrical circuit diagram showing a detail of the embodiment of FIG. 6; and FIG. 8 is a block diagram of still another embodiment of the time-update circuitry and control output circuitry for use in the apparatus and method of FIG. 1.

DETAILED DESCRIPTION OF THE PREFERRED EMBODIMENTS

Figures 1, 3:
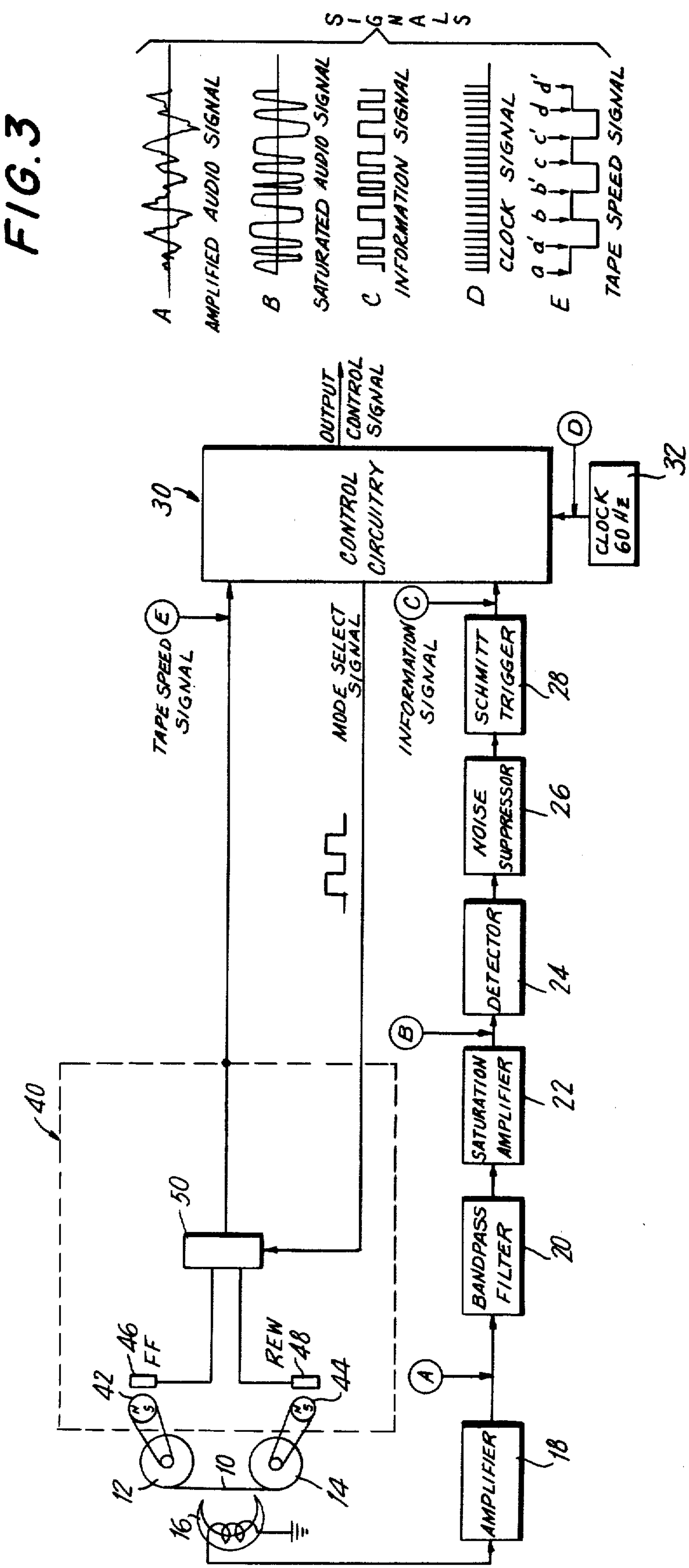
FIG. 1 is a block diagram of the apparatus for, and method of, distinguishing between inter-feature and intra-feature pauses in accordance with this invention.
FIG. 3 is a set of graphs showing the amplitude versus time characteristics of the signals identified in FIG. 1 by the reference characters A, B, C, D and E.

Referring now to the drawings, reference numeral 10 in FIG. 1 identifies a recording medium in the form of a conventional magnetic recording tape. A plurality of programs or features are recorded on the tape. These features may be composed of music, vocal renditons, speech, or any other recordable information or intelligence.

These features are separated by inter-feature pauses between features. The first feature is customarily preceded by a pause, and the last feature is customarily followed by a pause. The term "inter-feature" pause, as used herein, is intended to include the pause ahead of the first feature, as well as the pause after the last feature. Typically, the features are recorded such that the inter-feature pauses have a time duration of about three seconds as measured when the tape is advancing at playback speed.

Pauses may be located within, and occur during, any feature. These are defined as "intra-feature" pauses. Intra-feature pauses may be breaks or short intermissions in the performance of music or rendition of speech, or may be passages of very low volume. Intra-feature pauses have time durations which are less than three seconds as measured when the tape is advancing at playback speed.

The tape 10 is supported and wound on supply reel 12 and takeup reel 14. A magnetic tape recording/reproduction system, such as a cassette tape recorder or a cassette tape deck, typically includes such tape reels. The term "reel" is intended to include not only conventional reels, but also rotating hubs or other rotary members for winding and for holding a magnetic recording tape.

A non-illustrated conventional capstan drive advances the tape 10 at a substantially constant speed in the playback mode of operation of the tape system. Also not illustrated is a conventional motor drive which drives the takeup reel 14 at a substantially constant speed in the fast forward mode, and which alternatively drives the supply reel 12 at a substantially constant speed in the rewind mode.

In order to effect the selective replay of certain recorded features on the tape 10, while bypassing other features, the invention generates an output control signal in response to detection of the inter-feature pauses. Hence, it is important to reliably distinguish between inter-feature and intra-feature pauses.

To this end, an information signal C is generated by recording medium sensor circuitry which includes a playback/recording tape head 16 operative for detecting the recorded features and the pauses on the tape 10, and for generating an electrical audio signal which is amplified by recording/playback amplifier 18 which has a frequency and amplitude equalizer characteristic. The amplitude versus time characteristic of the amplified audio signal A is shown in FIG. 3.

The amplified audio signal A is next conducted to a bandpass filter 20 which rejects the lower frequencies to eliminate noise, and thereupon is conducted to a saturation amplifier 22 which generates a saturated audio signal B. As shown in FIG. 3, the saturated audio signal is characterized by a high voltage amplitude when an audio signal is present, and by a low voltage amplitude when no recorded signal (i.e. a pause) is present.

The saturated signal B is next conducted to a detector 24 which cuts off the negative-going portions of signal B, and thereupon is conducted to a noise suppression circuit 26 wherein noise pulses within a pause are eliminated. Thereupon, the signal is conducted to a schmitt trigger circuit 28 which processes and shapes the information signal C as a pulse train. The high voltage amplitudes or heights of the pulses represent audio information concerning the features. The pulse widths represent the time duration of the audio information concerning the features.

On the other hand, the time duration between each adjacent pair of pulses represents information concerning the pauses. More particularly, the time duration between each adjacent pair of pulses is indicative of the time duration of each detected pause on the tape. The detected pause may either be an inter-feature pause, or an intra-feature pause. This determination is made in the control circuitry 30, as described below. At this point, it is sufficient to understand that the time duration of each low voltage amplitude of the information signal C is a measure of the time duration of each detected pause.

The function of the control circuitry 30 is to distinguish an inter-feature pause from an intra-feature pause, and to generate an output control signal whenever an inter-feature pause is determined. This is achieved by measuring the time duration of each detected pause and comparing it to a decision period of predetermined time duration. The decision period serves as the time standard or reference against which the pauses are distinguished. If the time duration of a pause is equal to or greater than the decision period, then this defines an inter-feature pause, and the output control signal is generated. On the other hand, if the time duration of the pause is less than the decision period, then this defines an intra-feature pause, and no output control signal is generated.

Turning now to FIG. 4, the control circuitry 30 for determining inter-feature pauses in the playback mode is illustrated. Clock means 32 is operative for generating a clock signal D comprising a series of timed clock pulses which are spaced apart by the same time duration. Preferably, the clock pulses have a frequency of 60 Hz.

The clock pulses serve as a time base for measuring the time duration of each detected pause. Thus, the information signal C is fed to the input of counter 34. The clock signal D is also fed to the counter 34. The counter 34 counts the number of clock pulses which are present in each time duration between adjacent pulses in the information signal C. The number of counted clock pulses is therefore an indication of the time duration of each detected pause.

It will be recalled that the tape speed is constant in the playback mode; hence, there is no need to sense the advancement speed of the tape, nor to update the decision period as a function of tape speed. As also noted above, the inter-feature pause in the playback mode is about three seconds. As a safety standard, we define an inter-feature pause as having a time duration of 2.67 seconds. Hence, for a 60 Hz clock signal, the counter 34 will count $2.67\times 60\cong 160$ clock pulses for an inter-feature pause. The count number 160 is stored in memory storage 36.

The control output means 38 has two inputs. One input is the number of clock pulses as counted by counter 34. The counted number of clock pulses from counter 34 indicates the time duration of each detected pause. The second input is the count number 160 which defines the time duration of an inter-feature pause in the playback mode.

The control output means 38 is a comparator. If the counted number of clock pulses from counter 34 equals and/or exceeds the fixed count number which is stored in memory storage 36, then this defines an inter-feature pause, and the comparator 38 generates an output control signal. On the other hand, if the counted number of clock pulses is less than the fixed count number, then this defines an intra-feature pause, and no output control signal is generated.

Turning back to FIG. 1, reference numeral 40 generally identifies speed sensor means for detecting the advancement speed of the tape, and for generating therefrom a tape speed signal E indicative of the speed of the tape. The tape speed signal E is used, as described below, to update the decision period for judging an inter-feature pause as a function of the tape speed.

Magnet ring 42 is operatively connected to, and driven by, supply reel 12 for joint rotation therewith. In the fast forward mode, the takeup reel 14 is driven at a constant speed and, as explained above, the tape speed relative to the head 16 increases as the tape is further wound up on the takeup reel 14. The tape 10 pulls on the supply reel, thereby concomitantly increasing its rate of rotation. Hence, the rotation rate of the magnet ring 42 is proportional to the tape speed in the fast forward mode.

A similar analysis can be made for magnet ring 44 whose rotation rate is proportional to the tape speed in the rewind mode.

Magnet rings 42, 44 respectively cooperate with Hall—effect elements 46,48 which are stationarily mounted on the tape system in the vicinity of the rings 42,44. The magnet rings 42, 44 generate a magnetic flux which is detected and converted to an electrical signal by the elements 46,48. The magnet rings 42,44 transmit flux information which incicates the presence or absence of the flux and, in turn, the elements 46,48 receive this information and generate the tape speed signal E as a pulse train.

As best shown in FIG. 3, the high voltage amplitude levels (a→a', b→b', etc.) of the pulses indicate the presence of a magnet ring near its associated Hall—effect element. The low voltage amplitude levels (a'→b, b'→c, etc.) of the pulses indicate the absence of a magnet ring and its remote location relative to its associated Hall—effect element. The tape speed signal E is characterized by a plurality of successive time cycles (a→b, b→c, etc.), each having a time duration which corresponds to the current speed of the tape.

If more than one magnet ring is associated with a particular reel, then the number of pulses in the tape speed signal E will increase correspondingly. In a preferred embodiment, two magnet rings are associated with each reel, and this results in one complete cycle (a→b, b→c, etc.) for each one-half revolution of a reel. Of course, more magnet rings or multiple flux-receiving elements for each magnet ring could also be used.

The flux-receiving elements may be any element which generates pulses indicative of the presence of magnetic flux. This includes Hall effect elements or semi-conductor elements whose resistance is proportional to the amount of flux which they receive.

The switch 50 is operative to select whether the tape signal derived from the supply reel or derived from the takeup reel is conducted to the control circuitry 30. The switch 50 is preferably an electrical switch responsive to a mode select signal. The mode select signal can be generated from the keyboard, or from the control circuitry 30.

Figure 2:
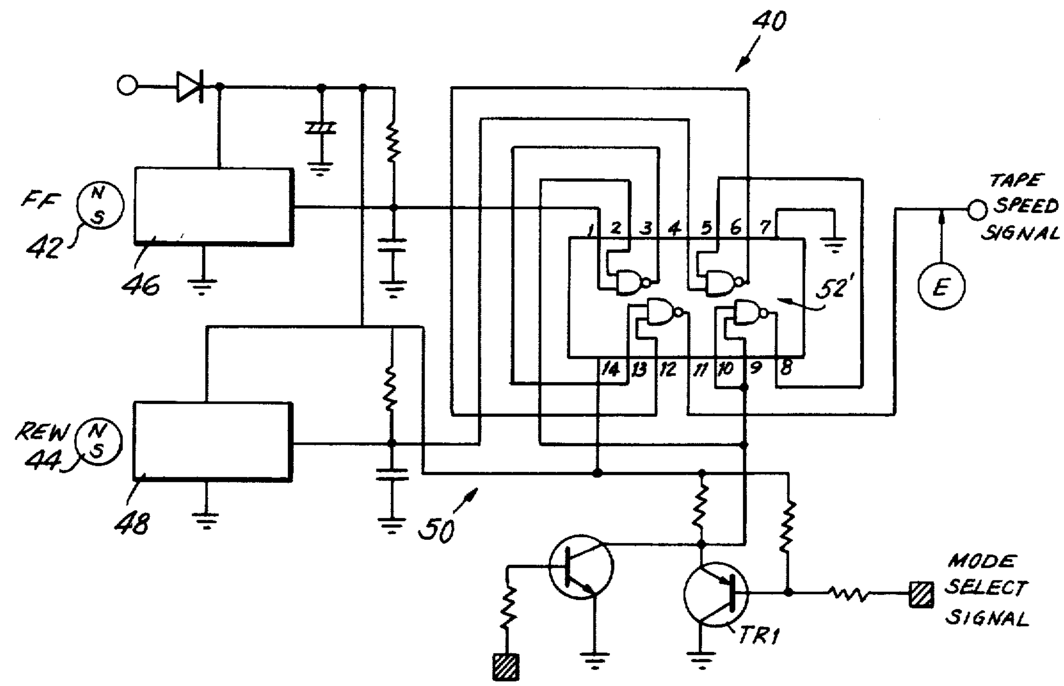
FIG. 2 is an electrical circuit diagram showing in detail the speed sensor circuitry of FIG. 1.

A preferred form of electrical switch 50 is shown in FIG. 2. The keyboard or control circuitry generates a high level amplitude for the mode select signal when the tape is advanced at the fast forward speed, and a low level amplitude when the tape is advanced at the rewind mode.

Hence, a high level signal (fast forward mode) at the base of transistor TR1 causes the emitter thereof to also become high. The NAND gate 52' has fourteen terminals each interconnected with the fast forward speed sensor elements 42,46 and with the rewind speed sensor elements 44,48 as shown in FIG. 2.

In the fast forward mode, terminals 9,10 of the NAND gate 52 go high; terminals 8,5 go low; terminal 6 goes high no matter whether terminal 4 is high or low; and terminal 12 goes high. Since terminal 2 is also high, terminal 3 goes high when a low signal is supplied to terminal 1. If a high signal is supplied to terminal 1, then terminal 3 goes low.

The output of terminal 3 is fed to terminal 13. The same level signal of the fast forward speed sensor elements 42,46 as appeared at terminal 1 appears at terminal 11 since terminal 12 is high. The tape speed signal is outputed from terminal 11.

Similarly, in the rewind mode, the terminals 9,10 go low, and the input signal from the rewind speed sensor elements 44,48 is fed to terminal 4. The tape speed signal is again outputed from terminal 11.

In summary, a high level voltage from the mode select signal causes the tape speed signal derived from the fast forward sensor elements to be transmitted to the control circuitry 50. A low level voltage from the mode select signal causes the tape speed signal derived from the rewind sensor elements 44,48 to be conducted to the control circuitry 30.

Figure 5:
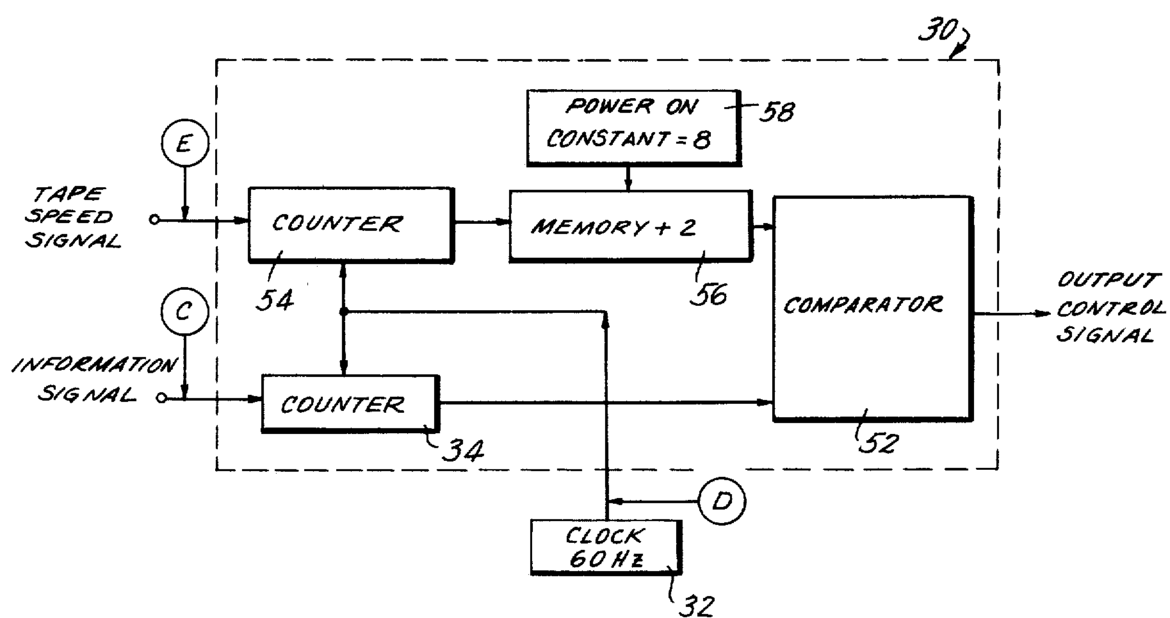
FIG. 5 is an electrical circuit block diagram showing in detail a preferred embodiment of the time-update circuitry and control output circuitry for use in the apparatus and method of FIG. 1 in the fast forward and rewind modes.

Turning now to FIG. 5, the control circuitry 30 for determining inter-feature pauses in the fast forward or rewind modes is illustrated. As before, the clock means 32 generates the 60 Hz clock pulses which are fed to counter 34 to which the information signal is also conducted. It will be recalled that the counter 34 counts up the number of clock pulses which indicates the time duration of each detected pause. The counted number is fed to one input of comparator 52.

The other input of comparator 52 is not supplied with a fixed count number as in the playback mode, but instead is supplied with an ever-changing number of clock pulses which defines the time duration of the inter-feature pause at the then-current speed of the tape. The number of clock pulses which defines the inter-feature pause is constantly being updated during the fast forward and rewind modes.

Each cycle (a→b, b→c, etc.) of the tape speed signal E is fed to a counter 54. The clock signal D is also fed to the counter 54. The counter 54 is operative to count the number of clock pulses in each cycle of the tape speed signal. The faster the tape advances, the shorter is the time duration of each cycle of the tape speed signal and, in turn, the fewer the number of clock pulses to be counted by the counter 54. The number of clock pulses actually counted by counter 54 is stored in memory storage register 56.

As noted above, the number of clock pulses for determining an inter-feature pause in the play mode is 160 clock pulses. If the tape speed doubles, then the number of clock pulses for determining an inter-feature pause is halved. If the tape speed increases by a factor of ten (e.g. fast forward speed at the beginning of the tape), then the number of clock pulses for determining an inter-feature pause is sixteen. If the tape speed increases by a factor of twenty (e.g. fast forward near the end of the tape), then the number of clock pulses for determining an inter-feature pause is about eight.

We have empirically determined that the counter 54 counts fourteen pulses, rather than sixteen, when the tape speed in the fast forward mode is about ten times faster than the playback speed. Hence, a built-in correction factor of two pulses is permanently stored in the memory register 56.

The number of clock pulses counted by the counter 54 and stored in the memory register 56 changes in accordance with changes in the tape speed. The memory register 56 is constantly updated, cleared, and then updated again with each new cycle. As noted above, each new cycle preferably represents one-half of a reel revolution. Hence, the decision period is updated at least once, and preferably twice, for each reel revolution.

When power is first turned on, and no tape speed signal has yet been generated, the memory register 56 has no initial value, and therefore no decision period has yet been determined for judging the presence of an inter-feature pause. Hence, means 58 for presetting the memory register 56 to have a predetermined number of clock pulses to be used as the decision period is provided. Preferably, the predetermined number of clock pulses is eight. When the tape speed signal has been generated after one cycle, the memory register 56 has been cleared and updated with the then-current number of clock pulses which represents the tape speed.

The comparator 52 compares the number of clock pulses indicative of the time duration of each detected pause with the number of clock pulses indicative of the time duration of the decision period for judging an inter-feature pause at the then-current speed of the tape. If the counted number of clock pulses from counter 34 equals and/or exceeds the then-current reference count number stored in memory storage 56, then this defines an inter-feature pause, and the comparator 52 generates an output control signal. On the other hand, if the counted number of clock pulses is less than the then-current reference count number, then this defines an intra-feature pause, and no output control signal is generated.

The embodiment of FIGS. 1-5 updates the decision period in a digital manner at least once per every reel revolution. As shown in FIG. 1, the magnet rings are operatively coupled by belts to the reels. The number of rotations of the rings per every reel revolution can therefore be adjusted as desired. This is typically often enough to have a reliable test for distinguishing inter-feature from intra-feature pauses. However, if even greater accuracy is required, then the embodiment of FIGS. 6 and 7 can be used to continuously update the decision period in an analog manner.

The analog control circuitry for continuously updating the decision period, and for generating the output control signal is shown in FIGS. 6 and 7. The tape speed signal E is fed to a frequency-to-voltage converter 60 operative for converting the frequency of the tape speed signal to a DC voltage. The higher the frequency of the speed signal, the larger the amplitude of the DC voltage.

The converter output is fed to means 62 for converting the DC voltage to light energy. The converting means 62 is preferably a light-emitting diode whose light energy output is proportional to the applied voltage. The higher the amplitude of the applied DC voltage, the greater the emitted light intensity.

The light-emitting diode 62 is optically coupled to a light-sensitive element R, preferably a cadmium sulfide resistor. The resistance of light-sensitive element R typically decreases from a few megohms to a few ohms when light impinges thereon. The more light which impinges on the element R, the lower the resistance of the element R.

The element R forms a time constant with capacitor C which is connected in series with element R to form the timer 64. Summarizing the operation so far, as the speed of the tape 10 increases, the number of cycles (frequency) of the tape speed signal increases, the DC voltage generated by converter 60 increases, the amount of light energy emitted by diode 62 increases, the resistance of element R decreases, and the time constant of timer 64 decreases. The time duration of the time constant represents the time duration of the decision period for judging an inter-feature pause. All of the above changes occur continuously, i.e. in non-stepped, analog manner.

In order to generate the output control signal, it is necessary to distinguish an inter-feature pause from an intra-feature pause. To obtain this result, the time-constant components R and C are connected between a B+ power supply and ground. The voltage Vc across the capacitor C is tapped off at terminal 68 and is conducted to a voltage comparator 66 which has the built-in reference voltage $^{V}$REF. The comparator 66 generates the output control signal when the capacitor voltage Vc equals or exceeds the predetermined reference voltage $^{V}$REF. If Vc is less than the reference voltage $^{V}$REF, then no output control signal is generated.

The information signal C is conducted to the reset switch 70. Reset switch 70 closes when a pulse is applied thereto, and opens when no pulse is applied thereto. Reset switch 70 is connected between terminal 68 and ground.

Hence, when the information signal conducts a pulse to reset switch 70, this indicates that a feature is present on the tape, and therefore the capacitor voltage Vc is shunted to ground, thereby resetting the capacitor voltage Vc to zero voltage. On the other hand, when the information signal does not conduct a pulse to reset switch 70, this indicates that a pause has been detected. In this case, the capacitor voltage Vc is permitted to increase at a charging rate corresponding to the then-current time constant of the timer 64. The capacitor voltage Vc is then compared to the reference voltage, and the output control signal is generated only when $Vc \geqq {}^{V}REF$.

The time constant of the timer is initially set to correspond with the time duration of an inter-feature pause when the tape is in the playback mode. The change in tape speed in the fast forward or rewind mode is continuously detected and appears in the timer as a continuously updated time constant. An increase in tape speed results in a shorter time constant, i.e. a shorter decision period in which to judge the inter-feature pauses.

Another control circuit for generating the output control signal is shown in FIG. 8. This control circuit is a mono-stable multi-vibrator. The light-sensitive element R' is identical to the element R described above in connection with FIGS. 6 and 7. The capacitor C' is identical to the element C also described above. The elements R' and C' together form a time constant which is to be continuously updated.

The multi-vibrator of FIG. 8 has an input terminal 72 to which the information signal C is applied. Biasing voltage is applied to terminal 74; terminal 76 is connected to ground. Power switch turns the transistors T1 and T2 to the stable state. The stable state is defined as transistor T1 being OFF and transistor T2 being ON. The stable state is achieved when the information signal conducts a pause (no pulse) to input terminal 72.

If the information signal conducts a positive pulse to terminal 72, the multi-vibrator assumes and maintains the meta-stable state as long as positive pulses are continuously being applied to the terminal 72. The meta-stable state is defined as the transistor T1 being ON, while the transistor T2 is OFF.

The multi-vibrator changes back to the stable state when no pulse is applied to the input terminal for a time duration which equals and/or is longer than the time constant determined by the elements R' and C'. The control output signal is generated whenever the time duration of the detected pause equals and/or is larger than the aforementioned time constant.

It will be recalled that element R' is a light-sensitive element whose resistance continuously varies as a function of the tape speed signal. Hence, the time constant decreases with increasing tape speed. This means that the time constant is continuously updated, and that the time duration for determining an inter-feature pause is changed as a function of the tape speed.

In accordance with this invention, the determination of an inter-feature pause is made as a function of the tape speed. The tape speed is not deliberately lowered as in the case of the prior art electrical and mechanical feedback schemes. We achieve rapid and accurate detection of inter-feature pauses. Once it is known how many inter-feature pauses have been detected, then this data can be used to select from a plurality of recorded features just what features are to be selectively played, and in what order the selected features are to be played.

It will be understood that each of the elements described above, or two or more together, may also find a useful application in other types of constructions differing from the types described above.

While the invention has been illustrated and described as embodied in an apparatus for and method of distinguishing pauses to control selective replay in tape recording/reproduction systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims:

1. In a recording/reproduction system for selectively replaying features recorded on a recording medium, and for advancing the recording medium at any one of a selected playback speed, fast forward speed and rewind speed, an apparatus for reliably distinguishing between inter-feature pauses between features and intra-feature pauses during features to control the selective replay of the recorded features, said apparatus comprising:

(a) recording medium sensor means for detecting the features and the pauses on the recording medium, and for generating therefrom an information signal indicative of the time duration of each detected pause;

(b) speed sensor means for detecting the advancement speed of the recording medium, and for generating therefrom a tape speed signal indicative of the speed of the recording medium throughout the advancement thereof;

(c) time-updating means for establishing an initial decision period of predetermined time duration against which the time duration of each detected pause can be compared for distinguishing between inter-feature pauses and intra-feature pauses, and for thereupon changing, in response to the generated tape speed signal, the time duration of the initial decision period in response to changes in the advancement speed of the recording medium; and (d) control output means for comparing the time duration of each detected pause with the time duration of the updated decision period to distinguish between inter-feature pauses and intra-feature pauses at all advancement speeds, and for generating therefrom an output control signal to control the selective replay of the recorded features in response to detection of an inter-feature pause.

2. The apparatus as defined in claim 1, wherein said recording medium sensor means includes a recording/-playback tape head for detecting the features and pauses on the recording medium, and means for shaping the information signal to constitute a pulse train having respective time durations between the heights of adjacent pulces which correspond to the time durations of the respectively-associated detected pauses.

3. The apparatus as defined in claim 1, wherein said system includes rotary supply and takeup reels on which the recording medium is wound; and wherein said speed sensor means includes means operatively associated with the supply and takeup reels, for generating the tape speed signal in response to rotation of the reels.

4. The apparatus as defined in claim 3, wherein said reel-associated means includes transmitter means for generating a magnetic flux, and receiver means for detecting the magnetic flux; and wherein said transmitter means is operatively mounted on the reels for rotation therewith; and wherein said receiver means is stationarily mounted on the system in the vicinity of the transmitter means, and is operative for detecting the presence or absence of the magnetic flux during rotation of the reels.

5. The apparatus as defined in claim 1, wherein said speed sensor means includes means for shaping the tape speed signal to constitute a pulse train having a plurality of successive time cycles each having a time duration which corresponds to the time duration of the decision period.

6. The apparatus as defined in claim 1, wherein said information signal is a pulse train which defines between the heights of adjacent pulses time durations corresponding to the time durations of the respective-associated detected pauses; and wherein the tape speed signal is a pulse train which has a plurality of successive time cycles each having a time duration corresponding to the time duration of the decision period; and wherein said time-updating means includes clock means for generating a series of timed clock pulses, and counter means operatively connected to said clock means, said recording medium sensor means and said speed sensor means; and wherein said counter means is operative for counting the number of clock pulses in each time duration between adjacent pulse heights in the information signal, and also for counting the number of clock pulses in each time duration of a cycle of the tape speed signal.

7. The apparatus as defined in claim 6, wherein said control output means compares the number of clock pulses counted in each time duration between adjacent pulse heights in the information signal against the number of clock pulses counted in each cycle of the tape speed signal, and wherein the output control signal is generated whenever the number of clock pulses from the information signal equals or exceeds the number of clock pulses from the tape speed signal.

8. The apparatus as defined in claim 7, wherein said time-updating means includes means for pre-setting the counter means to have an initial predetermined number of clock pulses to be counted from the tape speed signal.

9. The apparatus as defined in claim 1, wherein said time-updating means changes the time duration of the initial decision period in inverse relationship to the change in the advancement speed of the recording medium.

10. The apparatus as defined in claim 1, wherein said time-updating means maintains the decision period at a substantially constant time duration when the recording medium is advanced at the playback speed, and wherein the time-updating means inversely changes the time duration of the decision period when the recording medium is advanced at either the fast forward speed or the rewind speed.

11. The apparatus as defined in claim 1, wherein said system includes rotary supply and takeup reels on which the recording medium is wound, and wherein said time-updating means updates the initial decision period at least once per every reel revolution.

12. The apparatus as defined in claim 1, wherein said time-updating means continuously changes the decision period in an analog manner.

13. The apparatus as defined in claim 12, wherein said speed sensor means includes means for emitting light with an intensity proportional to the advancement speed of the recording medium; and wherein said time-updating means includes a light-sensitive timing device operatively connected to the recording medium sensor means, for continuously changing the time duration of the decision period in response to the intensity of light received by the timing device.

14. The apparatus as defined in claim 13, wherein said light-emitting means includes means for converting the advancement speed of the recording medium to an electrical voltage and, in turn, to light energy; and wherein said timing device includes a photo-detector for determining the time duration of the decision period in response to the amount of light energy which impinges on the photo-detector.

15. The apparatus as defined in claim 13, wherein said timer means generates a timer voltage having a voltage amplitude dependent on the time duration of each detected pause; and wherein said control output means compares the voltage amplitude of the timer voltage against a predetermined reference voltage, for distinguishing between inter-feature and intra-feature pauses.

16. In a recording/reproduction system for selectively replaying features recorded on a recording medium, and for advancing the recording medium at any one of a selected playback speed, fast forward speed and rewind speed, a method of reliably distinguishing between inter-feature pauses between features and intra-feature pauses during features to control the selective replay of the recorded features, said method comprising the steps of:

(a) detecting the features and the pauses on the recording medium, and generating therefrom an information signal indicative of the time duration of each detected pause;

(b) detecting the advancement speed of the recording medium, and generating therefrom a tape speed signal indicative of the speed of the recording medium throughout the advancement thereof;

(c) establishing an initial decision period of predetermined time duration against which the time duration of each detected pause can be compared for distinguishing between inter-feature pauses and intra-feature pauses, and thereupon changing, in response to the generated tape speed signal, the time duration of the initial decision period in response to changes in the advancement speed of the recording medium; and (d) comparing the time duration of each detected pause with the time duration of the updated decision period to distinguish between inter-feature pauses and intra-feature pauses at all advancement speeds, and generating therefrom an output control signal to control the selective replay of the recorded features in response to detection of an inter-feature pause.

17. The method as defined in claim 16, wherein said step of generating the information signal includes shaping the latter as a pulse train having time durations between the heights of adjacent pulses which correspond to the time durations of the respectively-associated detected pauses; and wherein said step of generating the tape speed signal includes shaping the latter as a pulse train having successive cycles each having a time duration which corresponds to the time duration of the decision period.

18. The method as defined in claim 17, and wherein said step of changing the time duration of the decision period includes the steps of generating a series of timed clock pulses, counting the number of clock pulses in each time duration between adjacent pulse heights in the information signal, and counting the number of clock pulses in each time duration of a cycle of the tape speed signal.

19. The method as defined in claim 18, wherein said step of generating an output control signal includes the step of comparing the number of clock pulses counted from the information signal against the number of clock pulses counted from the tape speed signal, and the further step of generating the output control signal whenever the number of clock pulses from the information signal equals or exceeds the number of clock pulses from the tape speed signal.

20. The method as defined in claim 18, wherein said step of counting clock pulses from the tape speed signal includes pre-setting the number of clock pulses to an initial predetermined number.

21. The method as defined in claim 16, wherein said step of changing the decision period is performed in inverse relationship to the change in the advancement speed of the recording medium.

22. The method as defined in claim 16, wherein the decision period is maintained at a substantially constant time duration when the recording medium is advanced at the playback speed, and is updated in an inverse manner when the recording medium is advanced at either the fast forward speed or the rewind speed.

23. The method as defined in claim 16, wherein the system rotates supply and takeup reels for advancing the recording medium, and wherein the step of changing the decision period is repeated at least once for every rotation of the reels.

24. The method as defined in claim 16, wherein the step of changing the decision period is continuously performed in an analog manner.

* * * * *